June 26, 1951     L. A. RICHARDSON     2,558,388
FORK TRUCK LIFT FRAME ATTACHMENT
Filed Nov. 29, 1949
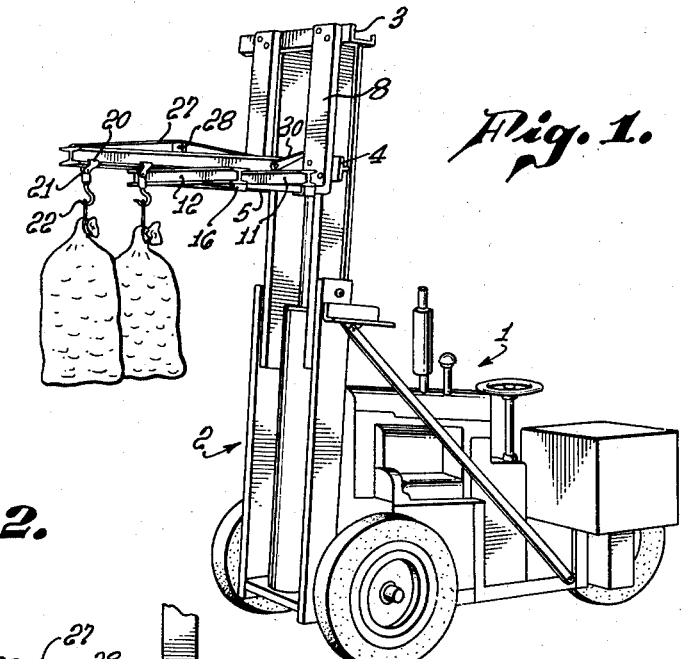
INVENTOR.
LEWIS A. RICHARDSON,
BY O. O. Martin
ATTORNEY.

Patented June 26, 1951

2,558,388

UNITED STATES PATENT OFFICE 2,558,388

FORK TRUCK LIFT FRAME ATTACHMENT

Lewis A. Richardson, Pico, Calif.

Application November 29, 1949, Serial No. 129,981

3 Claims. (Cl. 214—75)

This invention relates to motor vehicles of the well-known commercial, load carrying type and has particular reference to means embodied in such vehicles for lifting and transporting heavy loads.

In a certain well-known type of motor vehicle, commonly known as a fork truck, a bifurcated platform extends forward horizontally from a lifting mechanism which is mounted on the front end of the truck. This type of device has proved itself very useful for handling material which is large enough to rest upon the prongs forming the platform thereof but its usefulness is limited to such material. A vastly greater field would be opened for this type of mechanism if it were capable of handling smaller, odd-shaped articles such as sacks, bags, boxes and the like. It is, in view of the foregoing, the object of the present invention to provide an attachment for such fork truck by means of which this type of vehicle becomes capable of picking up and transporting any type of material which cannot be handled by the fork truck as manufactured.

The objects of the invention will be better understood upon perusal of the following detailed description and by referring to the accompanying drawing in which a preferred type of the invention is illustrated.

In the drawings:

Fig. 1 shows, in perspective, a fork truck to which the device of the invention is attached;

Fig. 2 is a fragmentary, front elevational view of a portion of Fig. 1;

Fig. 3 is a substantially corresponding side view of this portion of the truck and the device of the invention mounted thereon; and Figs. 4 and 5 are detail views of parts of the invention, the importance of which will be apparent upon perusal of the description to follow.

In the form illustrated in the drawings the numeral 1 designates a conventional fork truck to the front end of which is secured a vertically extending lifting mechanism 2, such as ordinarily found in this type of truck. A carriage is mounted for vertical sliding movement within this mechanism and it is suitably connected for operation by the motor of the vehicle. Since these devices are commercially well-known, it is not thought necessary to burden the case with a detailed description thereof or necessary to complicate the drawings, but it is thought sufficient to point out that elements such as lugs or bars 3,4 project from this carriage for the purpose of supporting thereon the usual bifurcated platform 5. The lifting mechanism is ordinarily so designed that the platform may be lowered to the ground in order to facilitate loading thereof and may be elevated to any desired height within the limit of the capacity of the lifting mechanism 2 to transport and deliver the goods deposited on the platform at any desired elevation within the capacity of the mechanism.

The device of my invention takes the form of a frame consisting of an I-beam 10 which rests on and is rigidly secured to transversely placed I-beams 11, 12, symmetrically extending from both sides of the beam 10, as indicated in the drawings. The supporting beam 11 is placed at one end of the beam 10 and the supporting beam 12 nearer the center thereof. To the underside of the beam 11 at each end thereof, is mounted a strap, 13, 14, of a size and shape slidably to fit over the prongs 6, 7 of the platform 5.

This arrangement is best shown in Fig. 1 of the drawings and it is seen that it is merely required to slip the straps 13, 14 over the ends of the prongs 6, 7 and to push the frame rearwardly along the platform until the straps 13, 14 come to rest against the upright portion 8 of the platform. During this movement, it is found that the supporting beam 12 rides along the upper surface of the platform to serve as a main support for the beam 10. In addition, it is to be noted that cleats 15, 16 depend from the ends of the cross beam 12 for the purpose of guiding the frame transversely on the platform and to absorb any side thrust against the platform during the loading and unloading operations thereof.

A plurality of straps 20 are mounted on the bottom flange of the beam 10 and each strap is fitted with a pivot 21 on which a hook 22 is mounted to swing. These hooks form attachment members for material to be transported such as sacks of flour, cement or the like which are hung on these hooks by means of loops such as ordinarily used for similar purposes in hoisting mechanism. When the device of my invention is placed on the platform, it is seen that it is possible to pick up, elevate and transport a great number of articles which could not be loaded on the platform when the device of the invention is removed therefrom. It is to be understood that while in the drawings I have only shown two hooks 22, it is possible to provide a greater number, if desired.

The strap 20 may be of any convenient construction and it is in the drawings shown to comprise a pair of clips 23 which are shaped to rest snugly against the lower flange of the beam 10 and which, at their lower ends are shaped to receive the pivot 21 on which the hook 22 is supported. The latter is made in two parts which are joined by means of a conventional swivel joint 24. When so constructed, it is seen that the hooks are free to swing on the pivots and to rotate on the joint 24 to suit any operating conditions. In addition, it is important to note that the straps may be rigidly secured to the I-beam as by a welding operation or they may be slidably supported thereon so that they may be adjusted, as may be required for particular loading operations.

Since the overhanging portion of the frame, to which the hooks 22 are affixed, is required to carry heavy loads and in order to construct the frame of as light material as possible, I prefer to provide means for supporting this portion of the frame. Such means is in the drawings shown to consist of a guy rope or wire 27 one end of which is fastened to the beam 10, at the inner end thereof. This rope passes over a post 28 which rises from the beam substantially in line with the beam 12 and extends to a point 29 on the beam at or near the outer end thereof. When such load supporting device is added, it is seen that the frame can be made much lighter and that, for this reason, the mounting and detachment of the device can be greatly facilitated.

It was above stated that the frame is mounted on the platform of the truck by merely pushing it on to the forks thereof until it comes to rest against the vertical frame of the lifting mechanism, in which position it can be relied upon to remain during operations of the truck when the parts are properly proportioned and fitted together. In order, however, to make certain that the frame will not become displaced or dislodged under any condition of operation thereof, it is possible to provide means for locking the frame in position on the forks of the truck. Such means is, for the sake of simplicity, in the drawings shown to consist of a pawl 30 which is pivotally hung on the beam 10 and shaped to engage the bar 4 of the lift carriage or any other convenient portion thereof.

It is seen from the foregoing that I have provided a very simple and convenient attachment to a fork truck. But while I have shown the device attached to a particular make of truck I wish it understood that it may be modified to fit other trucks of the same type. It should be noted, also, that the main load bearing portion of my device overhangs the platform 5 of the truck and that, for this reason, the device will be equally adapted for use on trucks having more than two prongs on their fork.

I claim:

1. For attachment to a truck having a bifurcated platform comprising prongs vertically movable at the front end thereof, parallel cross members detachably seatable on the prongs of the platform and having elements engaging said prongs to hold the cross members against vertical and lateral displacement thereon, a beam rigidly seated on said members parallel with and centrally positioned between the platform prongs, said beams extending a distance beyond the prongs, straps slidable on the beam having pivots at the bottom thereof, and hook members rotatably hung on the pivots of said straps to support articles to be transported by the truck.

2. For attachment to a truck having a bifurcated platform comprising prongs vertically movable at the front end thereof, parallel cross members detachably seatable on the prongs of the platform and having elements engaging said prongs to hold the cross members against vertical and lateral displacement thereon, a beam the inner end of which is seated on said members parallel with and centrally extending a distance beyond the prongs, straps on the overhanging outer end of the beam having pivots at the bottom thereof, and hook members hung on the pivots of said straps to support articles to be transported by the truck, said hook members having each a swivel joint intermediate its ends.

3. For attachment to a truck having a bifurcated platform comprising prongs vertically movable at the front end thereof, a frame including parallel cross members detachably seatable on the prongs of the platform said members having elements engaging said prongs to hold the members against vertical and lateral displacement thereon, a beam rigidly seated on said members parallel with and midway between the platform prong, more than one-half the length of said beam extending beyond the prongs of the platform, straps on the beam having pivots at the bottom thereof, means for locking the frame against removal from the platform, and hook members hung on the pivots of said straps to support articles to be carried by the truck.

LEWIS A. RICHARDSON.

REFERENCES CITED

The following references are of record in the file of this patent:

UNITED STATES PATENTS

| Number | Name | Date |
|---|---|---|
| 2,068,825 | Stevenson | Jan. 26, 1937 |
| 2,362,991 | Dahl | Nov. 21, 1944 |
| 2,364,493 | Ulinski | Dec. 5, 1944 |
| 2,387,744 | Clapp | Oct. 30, 1945 |
| 2,410,373 | Westervelt, Jr. | Oct. 29, 1946 |
| 2,431,589 | Shuler, Jr. | Nov. 25, 1947 |
| 2,490,772 | Benner | Dec. 13, 1949 |